US012722516B2

(12) United States Patent
Sharifipour et al.

(10) Patent No.: US 12,722,516 B2
(45) Date of Patent: Sep. 1, 2026

(54) ELECTRIC VEHICLE SOLAR CHARGING SYSTEM

(71) Applicants: Bahman Sharifipour, Newington, NH (US); Brian Reeves, Hamilton (CA); Paul Reeves, Oakville (CA); Sean Burke, Morgan Hill, CA (US)

(72) Inventors: Bahman Sharifipour, Newington, NH (US); Brian Reeves, Hamilton (CA); Paul Reeves, Oakville (CA); Sean Burke, Morgan Hill, CA (US)

( * ) Notice: Subject to any disclaimer, the term of this patent is extended or adjusted under 35 U.S.C. 154(b) by 1021 days.

(21) Appl. No.: 17/702,129

(22) Filed: Mar. 23, 2022

(65) Prior Publication Data

US 2022/0396167 A1 Dec. 15, 2022

Related U.S. Application Data

(60) Provisional application No. 63/208,805, filed on Jun. 9, 2021.

(51) Int. Cl.
*B60L 53/51* (2019.01)
*B60L 53/14* (2019.01)
(Continued)

(52) U.S. Cl.
CPC ............... *B60L 53/51* (2019.02); *B60L 53/22* (2019.02); *B60L 53/60* (2019.02); *H02J 3/381* (2013.01);
(Continued)

(58) Field of Classification Search
CPC .......... B60L 53/51; B60L 53/22; B60L 53/60; B60L 53/14; B60L 53/16; B60L 2210/10;
(Continued)

(56) References Cited

U.S. PATENT DOCUMENTS 6,157,165 A * 12/2000 Kinoshita ............. B60L 3/0046 320/118
10,432,082 B1 * 10/2019 Sharifipour ............. H02M 1/10
(Continued)

OTHER PUBLICATIONS

Alex Triano, Application Report SLVAE51A: Basics of Power MUX, Oct. 2020, Texas Instruments Incorporated (Year: 2020).*

*Primary Examiner* — Drew A Dunn
*Assistant Examiner* — Daniel P Mcfarland
(74) *Attorney, Agent, or Firm* — The Rapacke Law Group, P.A.

(57) ABSTRACT

An electric vehicle solar charging system is disclosed, comprising a photovoltaic system or a DC source to transmit DC electricity to an electric vehicle via DC/DC conversion system. The DC/DC conversion is configured to directly transmit power to a battery pack configured to power the electric vehicle through the electric vehicle's DC charging inputs. This electricity can be supplemented by building battery or energy storage systems with DC output, or by DC electricity converted from AC which was supplied by AC sources. The combined circuit can be further modified by an in-line DC/DC converter at the output if necessary, which also may be a bidirectional converter to supply energy from the EV back to the house load through a connected AC/DC inverter. When no DC is available, an AC power source can optionally provide supplemental power to the electric vehicle directly through the AC charging inputs.

18 Claims, 6 Drawing Sheets

(51) Int. Cl.

| | |
|---|---|
| ***B60L 53/16*** | (2019.01) |
| ***B60L 53/22*** | (2019.01) |
| ***B60L 53/60*** | (2019.01) |
| ***H02J 3/38*** | (2026.01) |
| ***H02J 3/46*** | (2026.01) |
| ***H02J 7/35*** | (2006.01) |
| ***H02J 101/24*** | (2026.01) |
| ***H02M 1/00*** | (2007.01) |
| ***H02M 1/10*** | (2006.01) |

(52) U.S. Cl.

CPC *H02J 3/46* (2013.01); *H02J 7/35* (2013.01); *H02M 1/0067* (2021.05); *H02M 1/007* (2021.05); *B60L 53/14* (2019.02); *B60L 53/16* (2019.02); *B60L 2210/10* (2013.01); *B60L 2210/30* (2013.01); *H02J 2101/24* (2026.01); *H02J 2207/20* (2020.01); *H02J 2207/40* (2020.01); *H02M 1/10* (2013.01)

(58) Field of Classification Search

CPC .. B60L 2210/30; B60L 53/52; B60L 2210/12; B60L 2210/14; H02J 3/381; H02J 3/46; H02J 7/35; H02J 2207/20; H02J 2207/40; H02J 2300/24; H02J 7/02; H02J 7/04; H02J 7/06; H02J 2300/28; H02M 1/0067; H02M 1/007; H02M 1/10; Y02T 10/7072; Y02T 90/10; Y02T 90/12

USPC ...... 320/101, 103, 104, 109; 307/65, 66, 80, 307/81, 85, 86

See application file for complete search history.

(56) References Cited

U.S. PATENT DOCUMENTS 10,457,159 B1* 10/2019 Castelaz ............. H02M 3/1582
11,584,250 B1* 2/2023 Palombini ............... B60L 53/16
2005/0235865 A1* 10/2005 Kumar .................... B60L 50/53 105/61
2008/0150366 A1* 6/2008 Adest ........................ H02J 3/18 307/77
2008/0203966 A1* 8/2008 Ward ...................... B60L 8/003 903/907
2009/0289594 A1* 11/2009 Sato .......................... G05F 1/67 320/101
2010/0157632 A1* 6/2010 Batten ..................... H02J 3/381 363/74
2010/0157638 A1* 6/2010 Naiknaware ...... H02M 3/33546 363/131
2010/0213887 A1* 8/2010 Louch ....................... H02J 7/35 320/101
2011/0133552 A1* 6/2011 Binder ...................... H02J 7/35 307/22
2011/0133555 A1* 6/2011 Choi ......................... H02J 7/35 307/65
2011/0273130 A1* 11/2011 Lee ..................... H01M 10/465 320/101
2011/0273917 A1* 11/2011 Maitra ...................... H02J 3/46 363/74
2011/0291616 A1* 12/2011 Kim ........................ B60L 3/003 320/109
2012/0019230 A1* 1/2012 Frisch .................. H02M 3/158 323/311
2012/0043923 A1* 2/2012 Ikriannikov .............. H02J 1/10 307/82
2012/0136534 A1* 5/2012 Walsh .................... B60K 16/00 701/36
2012/0146572 A1* 6/2012 Ward ...................... B60L 8/003 320/101
2012/0169280 A1* 7/2012 Chi ........................... H02J 7/02 320/109
2012/0223670 A1* 9/2012 Kinjo ........................ H02J 7/35 320/135
2012/0249065 A1* 10/2012 Bissonette ............. H02J 3/381 320/109
2013/0049676 A1* 2/2013 Ishikawa ................ B60L 53/53 320/103
2013/0063119 A1* 3/2013 Lubomirsky ........... H02J 3/381 323/304
2013/0106342 A1* 5/2013 Iwata ...................... B60L 8/003 320/101
2013/0113413 A1* 5/2013 Harty ...................... B60L 53/14 320/109
2013/0175971 A1* 7/2013 Har-Shai ................... H02J 7/00 320/101
2013/0307479 A1* 11/2013 Kim ......................... H02J 7/52 320/155
2013/0320911 A1* 12/2013 Kamiya .................. B60L 3/003 320/101
2014/0183945 A1* 7/2014 Kusunose ................. H02J 3/32 307/18
2014/0253018 A1* 9/2014 Kong ...................... H02J 7/342 320/104
2014/0285010 A1* 9/2014 Cameron .................. H02J 1/14 307/29
2014/0300185 A1* 10/2014 Buchstaller ............... H02J 3/32 307/18
2015/0001932 A1* 1/2015 Inoue ....................... H02J 7/35 307/24
2015/0130281 A1* 5/2015 Sabripour ........... H01M 10/465 307/66
2015/0162784 A1* 6/2015 Kydd ..................... B60L 53/20 307/9.1
2015/0183329 A1* 7/2015 Nakaya .................. B60L 50/51 307/51
2015/0202973 A1* 7/2015 Chang ..................... B60L 53/20 320/109
2015/0214847 A1* 7/2015 Shimada ................. H02M 3/01 363/17
2015/0280487 A1* 10/2015 Nakazawa ............. B60L 58/20 320/101
2015/0291035 A1* 10/2015 Nagashita ............... H02M 1/10 307/9.1
2016/0016479 A1* 1/2016 Khaligh ............. H02M 1/4258 336/170
2016/0079776 A1* 3/2016 Iguchi ..................... B60L 53/22 320/134
2016/0101704 A1* 4/2016 McCalmont ........... B60L 53/00 320/101
2016/0114693 A1* 4/2016 Tsuno ..................... B60L 53/14 320/134
2016/0126367 A1* 5/2016 Dunton ................ H03K 17/687 307/115
2016/0172862 A1* 6/2016 Nishigai ................. H02J 1/082 307/25
2016/0181944 A1* 6/2016 James ..................... B60L 53/11 363/127
2017/0063233 A1* 3/2017 Lehn ....................... H02M 1/15
2017/0085106 A1* 3/2017 Bai ........................... H02J 7/00
2017/0170782 A1* 6/2017 Yoscovich ............. H02S 50/00
2018/0037121 A1* 2/2018 Narla ...................... B60L 53/20
2018/0110150 A1* 4/2018 Blanchet ................. B60L 53/51
2018/0339595 A1* 11/2018 Chang ..................... B60L 53/20
2018/0358839 A1* 12/2018 Perez ...................... H02J 9/061
2018/0375339 A1* 12/2018 Sharifipour ............. H02J 1/082
2019/0071033 A1* 3/2019 Hinterberger ........... H02M 7/04
2019/0241089 A1* 8/2019 Heyne ..................... B60L 53/63
2019/0305554 A1* 10/2019 Sharifipour ............ G05F 1/577
2019/0319456 A1* 10/2019 Brathwaite ............... H02J 1/00
2019/0319459 A1* 10/2019 Brathwaite ............... H02J 3/38
2019/0381906 A1* 12/2019 Giebel .................... B60L 53/11
2020/0062138 A1* 2/2020 Smolenaers ............ B60L 53/53
2020/0070672 A1* 3/2020 Vahedi .................... B60L 53/11
2020/0083731 A1* 3/2020 Sone .................. H02M 3/1584
2020/0298722 A1* 9/2020 Smolenaers ............ B60L 53/24
2021/0001742 A1* 1/2021 Choi ....................... B60L 53/30
2021/0007142 A1* 1/2021 Bendlin ............ H04W 74/0816
2021/0070185 A1* 3/2021 Liu ......................... B60L 53/14

(56) References Cited

U.S. PATENT DOCUMENTS

2021/0078435 A1* 3/2021 Van De Water ........ H02J 3/322
2022/0024334 A1* 1/2022 Marczi .................... B60L 53/10
2022/0158464 A1* 5/2022 Ibrahim .................. B60L 53/14
2022/0200303 A1* 6/2022 Swamy ................... H02J 7/342
2022/0360086 A1* 11/2022 Zhou ......................... H02J 3/32
2023/0173928 A1* 6/2023 White, III ............... H02S 10/40
320/109
2023/0307918 A1* 9/2023 Ginart ..................... H02J 3/322
2023/0391218 A1* 12/2023 Zhang ..................... B60L 53/11
2023/0402845 A1* 12/2023 Albanna ................. B60L 53/11
2023/0411967 A1* 12/2023 Finn ........................ B60L 53/11
2024/0051407 A1* 2/2024 Quan ........................ H02J 3/36
2024/0067023 A1* 2/2024 Yoon ....................... B60L 53/62
2024/0195209 A1* 6/2024 Zhang ..................... H02J 7/345
2024/0243603 A1* 7/2024 Li ............................. H02J 7/04
2024/0286509 A1* 8/2024 Eizips ..................... B60L 53/30
2024/0305115 A1* 9/2024 Foland .................... B60L 53/10
2025/0300456 A1* 9/2025 Takeuchi .................. H02J 1/12

* cited by examiner

ELECTRIC VEHICLE SOLAR CHARGING SYSTEM

CROSS-REFERENCES TO RELATED APPLICATIONS

This Non-Provisional Application claims the benefit of prior Provisional Application No. 63/208,805, filed on Jun. 9, 2021, which is hereby incorporated by reference in its entirety.

TECHNICAL FIELD

The embodiments generally relate to electric vehicle charging systems and more particularly relate to solar-powered electric vehicle charging systems.

BACKGROUND

Electric vehicles (EVs) must be charged regularly to ensure their battery packs have sufficient energy to power the vehicle. EV supply equipment (EVSE), commonly known as EV chargers, are devices that supply electric energy for the recharging of plug-in electrical vehicles, neighborhood electric vehicles, and plug-in hybrids. The battery pack in the EV charges and discharges direct current (DC) electricity. Some EV chargers supply standard alternating current (AC) electricity to the EV, which first flows through an onboard AC/DC converter before entering the battery management system of the battery pack to charge the battery cells. Others use high-capacity charging stations that provide electrical conversion, monitoring, and safety functionalities. These stations can support faster charging than residential charging stations by using direct current (DC) at higher voltages directly to the onboard battery management system of the battery pack, avoiding the onboard AC/DC converter.

Solar arrays may be used to supply power to electric vehicles. When EV charging is concurrent with solar generation, the solar array transmits direct current (DC) electricity to a solar inverter, which inverts the electricity to alternative current (AC). Some of this electricity may be supplied to the power grid or an AC-based energy storage system (electro-chemical batteries, kinetic storage, gravitational storage, etc.), while some is transmitted to the EV having an onboard converter and battery. The AC/DC converter onboard the EV converts the electricity back to DC to charge the battery pack. Alternatively, fast high-voltage DC charging involves the same converted solar power supplied to an AC/DC converter in the EV charging device which converts the AC to high-voltage DC and sends it to the EV's battery pack, avoiding the EV's onboard AC/DC converter. Traditional EV chargers using electricity from solar arrays first use inverters.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The embodiments provided herein relate to an electric vehicle (EV) solar charging system, comprising a photovoltaic system to transmit power either directly or round-trip through energy/battery storage, or a combination of both, to an electric vehicle via a DC/DC converter. The voltages of the direct solar electricity and of the power storage system are adjusted to a matched constant voltage (for example, between 420 and 380 Vdc) through DC/DC converters, increasing or lowering the voltage as necessary, depending on the origin voltage of each. This DC/DC conversion can be managed internal to the device or external to the device through, for example, a DC-connected hybrid photovoltaic (PV) string inverter, where that desired fixed output range is set by default or communicated to by EVSE device. This output can be further adjusted to match the desired voltage communicated by the battery management system of the EV's onboard battery pack, which may be different for different EVs. This adjustment may be performed at the initial DC/DC conversion stage at input, or by an inline DC-DC converter at output, which also may be bi-directional to also return power from the EV battery pack into the house load if desired (e.g., for emergency power use during a grid outage, or for peak grid-management by the power utility). The DC output circuit feeds directly to the EV's battery back through the DC charging ports of the EV, which may be EV charging plug ports. In periods of low light or lack of stored solar energy, or to increase the charge rate of DC alone, an AC power source can be converted to high voltage DC, added to the DC/DC modified DC output of the solar generation stream, and sent to the DC charging ports of the EV either directly or through the bi-directional DC-DC converter if necessary. Alternatively, when insufficient solar generated or stored electricity is available, a standard AC power source can provide power to the electric vehicle's battery charger through the EV's onboard AC/DC converter through the AC charging ports of the EV, which may be an EV charging plug.

The system may use DC power provided by the photovoltaic system. In one aspect, the system uses the DC power supplied from solar energy which can be directly used to charge the batteries of the electric vehicle. The DC power from the photovoltaic (PV) system supplies power to isolated DC/DC converter to create the appropriate voltage for the electric vehicle. For example, the appropriate voltage may be between 100V to 450V. The DC power can come directly from PV solar strings, or through DC outputs of a hybrid PV inverter, which itself is connected to PV solar strings. The output power is proportional to the available solar power, such as 15 KW. The DC power is provided to the EV battery pack through the DC ports of the EV charging plug.

The system may use other clean-tech generation other than, or in addition to, PV solar generation, as the source of on-site generated electricity, especially as DC electricity. Solar PV generation can be considered to be used interchangeably with any on-site electrical generation technology; that is, electricity supplied other than from the grid.

The system may be operable in low light conditions which decrease or eliminate solar power provided by the photovoltaic system. DC electricity can be provided by building battery storage or other types of energy storage (kinetic energy storage, pumped energy storage or others), either directly or through DC outputs of a connected hybrid PV inverter. The DC power from the energy system supplies power to an isolated DC/DC converter to create the appropriate voltage for the electric vehicle. For example, the appropriate voltage may be between 100Vdc to 450Vdc. The output power is proportional to the available discharge capacity of the energy storage system. The DC power is provided to the EV battery pack through the DC ports of the EV charging plug.

The system may be operable in low light conditions which decrease or eliminate solar power provided by the photovoltaic system. Standard AC electricity can be provided and converted to DC with an AC/DC converter to create the appropriate voltage for the electric vehicle. For example, the appropriate voltage may be between 100Vdc to 450Vdc. The output power is proportional to the available supplied AC power, such as 9.6 KW for a 240V 40 A AC supply. The DC power is provided to the EV battery pack through the DC ports of the EV charging plug.

The system may increase its charge rate by combining two or more of the PV solar, building energy storage and standard AC converted to DC sources. The voltages of the two or three of the sources are matched and combined to achieve a faster charge rate than provided by any one individually. The aggregation of these streams into a single DC output occurs prior to the DC ports of the EV charging plug.

In one aspect, the DC output can be fed through a bi-directional DC-DC converter prior to the charge ports, which can both dynamically match the voltage desired the EV's battery management system and return electricity from the EV battery pack back into the house load for emergency use or peak leveling situations. The bi-directional DC-DC converter takes the combined DC inputs prior the DC ports of the EV charging plug.

The system may be operable in low light conditions which decrease or eliminate solar power provided by the photovoltaic system. When little or no DC electricity is available, the system switches to standard AC electricity provided directly through to the AC ports of the of the EV charging plug, which is then converted to DC by the on-board EV AC/DC converter to create the appropriate voltage for the electric vehicle. The output power is proportional to the available power from the building breaker panel. This option is available when the EV charging plug and EV charging control allows for both AC and DC port connections in the same charging plug.

Additionally, the AC input can be dynamically switched to the AC charging inputs of a second EV, which may be an AC charging EV port plug, and used to charge a second EV through its on-board AC/DC converter. This charging can be concurrent with charging of the other vehicle through the DC ports of its EV charging plug.

In one aspect, a controller is provided to permit the system to automatically control the power source(s) based on power input from the photovoltaic system, DC output of a PV hybrid string inverter, building battery storage, DC supplied directly to EV battery pack converted from standard AC and AC supplied directly to the EV's onboard AC/DC converter. Alternatively, the user may manually alter the power source based on power demands and availability.

In one aspect, the electric vehicle includes an onboard charger.

In one aspect, the photovoltaic system includes a rapid shutdown optimizer to optimize power and ensure proper bounded voltage is transmitted to the inverter from panels which may have varying voltage outputs due to dynamic shadowing, mixed loads, soiling, debris, etc.

In one aspect, the system includes an inverter that receives surplus power from the photovoltaic system or discharge current from the electric vehicle, in DC form, and converts it to AC current for household or for grid use.

In one aspect, the inverter is a hybrid PV inverter that receives surplus power from the photovoltaic system, and in discharge mode receives discharge current from the electric vehicle with the hybrid inverter being able either to receive supplemental current for AC current output from a rechargeable energy source or to transmit DC current to the energy source for recharging.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
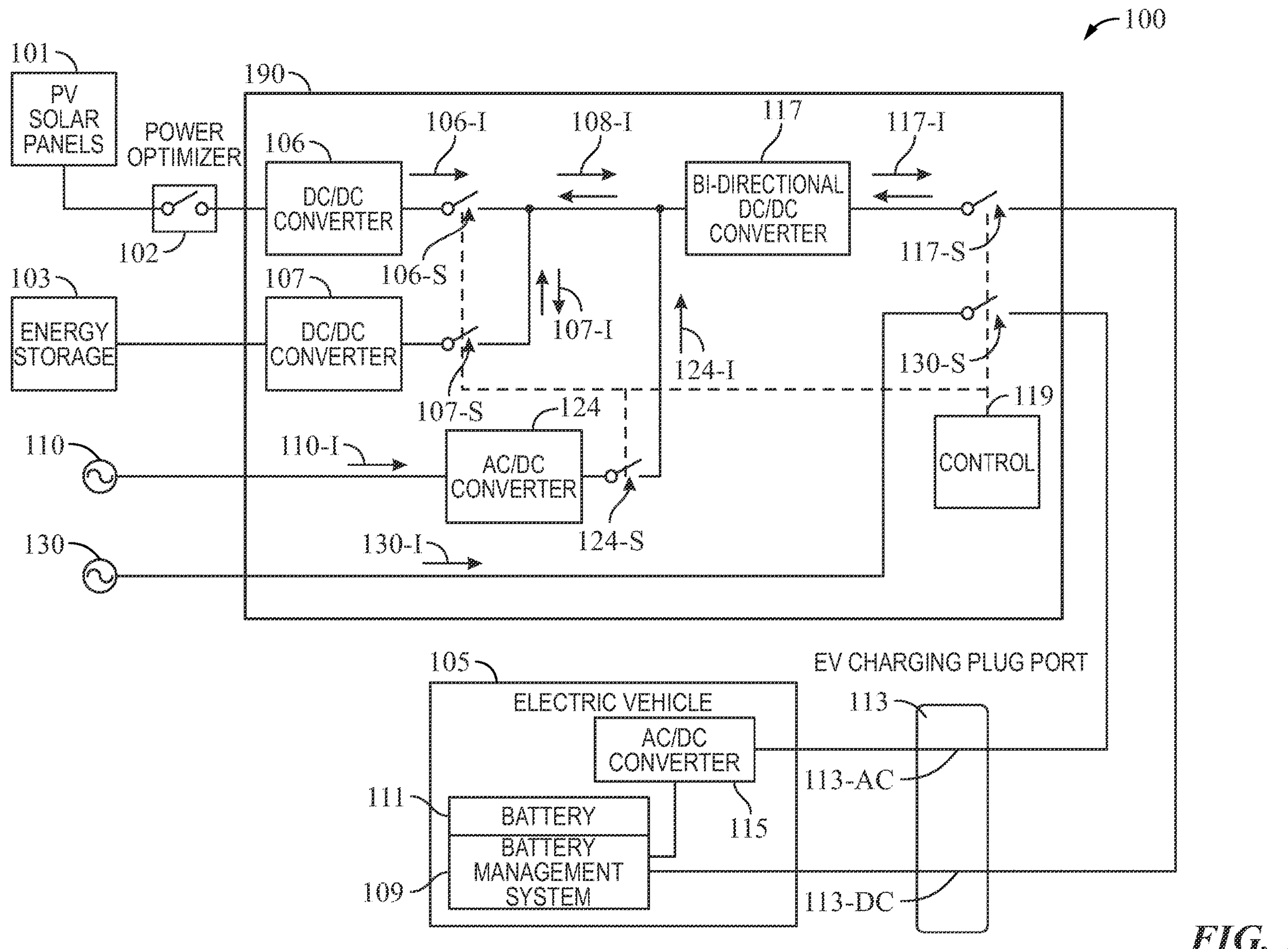
FIG. 1 illustrates a schematic of the electric vehicle solar charging system, according to some embodiments.

The specific details of the single embodiment or variety of embodiments described herein are to the described apparatus. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as "first" and "second," "top" and "bottom," and the like, may be used solely to distinguish one entity or element from another entity or element without necessarily requiring or implying any physical or logical relationship, or order between such entities or elements.

In general, the embodiments provided herein relate to an electric vehicle charging system which uses energy provided by photovoltaic systems (or other renewable energy sources) designed to supply usable power to the electric vehicle. The system uses the DC power supplied from solar energy which can be directly used to charge the batteries of the electric vehicle. Generally, the system uses DC power from the photovoltaic system to supply power to an isolated DC/DC converter as necessary to create the appropriate voltage for the electric vehicle. For example, the appropriate voltage may be between 100V to 450V. The output power is proportional to the available solar power, such as 15 KW.

FIG. 1 illustrates the electric vehicle solar charging system 100, including a photovoltaic system 101 to transmit power (a first input current in the form of direct current or DC) either directly or round-trip through energy/battery storage 103, or a combination of both, to an electric vehicle 105 via an EVSE or electric vehicle charging device 190 that includes first and second DC/DC converters 106 and 107 as necessary to achieve the desired output voltage. In some embodiments, the photovoltaic system 101 transmits power through a power optimizer 102, with the first input current traveling from the power optimizer 102 to the DC/DC converter 106. The DC/DC converter 106 is configured to generate a first output current 106-I based on the first input current and to output the first output current 106-I through a first switch 106-S when the first switch 106-S is closed. In some embodiments, the DC/DC converter 106 is electrically connected to the EV 105 (for example, when the first switch 106-S is closed) (not shown), while in other embodiments, the DC/DC converter 106 is electrically connected to a DC/DC converter 117, as shown in FIG. 1. In some embodiments, the DC/DC converter 106 is not required if a hybrid PV inverter's DC input/output delivers power directly at the desired fixed current 106-I, where that desired fixed output range is set by default or communicated by the charging device 190. In some embodiments, the PV system 101 includes a hybrid inverter that outputs power from the PV system 101 to the charging device 190 (not shown). In such embodiments, the charging device 190 does not have a DC/DC converter 106 (not shown) and is configured to receive a PV voltage request signal and to generate an output (a fixed voltage and/or a voltage within a fixed range) based on the PV voltage request signal. The PV voltage request signal can come directly from the EV 105 and/or from the charging device 190 to the PV system 101. In some embodiments, the charging device 190 is configured to receive a voltage required signal from the EV 105 and/or the battery management system 109, to generate the PV voltage request signal based on the voltage required signal, and to send the PV voltage request signal to the PV system 101. In some embodiments, the PV system 101 is configured to receive the PV voltage request signal from the EV 105, the battery management system 109, and/or from the charging device 190. The energy storage 103 is electrically connected to the second DC/DC converter 107. The DC/DC converter 107 is configured to generate and/or transmit a second output current 107-I. In some embodiments, the DC/DC converter 107 is bidirectional and configured to generate a second output current 107-I when the system 100 is in EV charging mode. In some embodiments, the second DC/DC converter 107 is bidirectional and configured to receive energy storage charging current 107-I when the system 100 is in EV discharging mode. The voltages of the direct solar electricity from the photovoltaic system 101 and of the electricity from the power/energy storage system 103 are adjusted to a matched constant voltage (for example, between 420 and 380 Vdc) through their respective DC/DC converters 106 and 107, as necessary, depending on the origin voltage of each. The output of the DC/DC converters 106 and 107 may be adjusted to match the desired voltage communicated by the battery management system 109 of the EV's onboard battery pack 111, which may be different for different EVs. Alternatively, the converter 106 can be substituted with fixed DC output of a connected PV hybrid string inverter, which may be adjusted to match the voltage desired by the battery management system 109. This adjustment may be performed by the DC/DC converters 106 and 107 at the input stage (meaning that DC/DC converter 106 and/or 107 are configured, individually and/or jointly, to adjust the voltages of output currents 106-I and/or 107-I), and/or by an inline DC/DC converter 117 at the output stage, which also may be bi-directional to also return power from the EV battery pack 111 into the house load if desired (e.g., for emergency power use during a grid outage, or for peak grid-management by the power utility). In some embodiments, the first DC/DC converter 106 is configured to determine a first voltage differential by comparing a voltage of the first input current with a first predetermined voltage parameter and to generate the first output current 106-I based on the first input current and the first voltage differential, wherein the first predetermined voltage parameter is a minimum operational voltage, a maximum operation voltage, or an operational voltage range. In some embodiments, the first DC/DC converter 106 is further configured to generate a voltage of the first output current at least as high as the first predetermined voltage parameter by generating a first output current 106-I with a voltage equal to a voltage of the first output current 106-I adjusted by the first voltage differential. The second DC/DC converter 107 is configured to receive an energy source charging current from the energy storage 103, the second DC/DC converter 107 further configured to generate a second output current 107-I based on the second input current and to output the second output current 107-I through the second switch 107-S. In some embodiments, the second DC/DC converter 107 is configured to determine a second voltage differential by comparing a voltage of the second input current with a second predetermined voltage parameter and to generate the second output current 107-I based on the second input current and the second voltage differential, wherein the second predetermined voltage parameter is a minimum operational voltage, a maximum operation voltage, or an operational voltage range. In some embodiments, the second DC/DC converter 107 is further configured to generate a voltage of the second output current at least as high as the second predetermined voltage parameter by generating a second output current 107-I with a voltage equal to a voltage of the second output current 107-I adjusted by the second voltage differential. In some embodiments, the first and the second voltage parameters are the same predetermined voltage parameter or are equal.

In some embodiments, the electric vehicle charging device 190 also includes an AC/DC converter 124. During periods of low light or lack of stored solar energy, or to increase the EV charge rate, an AC input current 110-I from an AC power source 110 can be converted to high voltage DC current, shown as the third output current 124-I, by the AC/DC converter 124 (the third converter), added to the modified DC output of the solar generation stream through a third switch 124-S when closed, and sent to the DC charging ports 113-DC of the EV 105 either directly (not shown) or through the bi-directional DC-DC converter 117 if necessary.

The first converter (DC/DC converter 106), the second converter (DC/DC converter 107), and the third converter (AC/DC converter 124) are each electrically connected to the fourth converter, DC/DC converter 117. In some embodiments, the first converter (DC/DC converter 106), the second converter (DC/DC converter 107), and the third converter (AC/DC converter 124) are each electrically connected to the fourth converter, DC/DC converter 117, when each of their respective switches (switches 106-S, 107-S, and 124-S) are closed. In some embodiments, the first converter 106 can be substituted with fixed DC output of a connected PV hybrid string inverter. In some embodiments, the electrical connections after each switch 106-S, 107-S, and 124-S create one node, as shown in FIG. 1. The fourth converter, DC/DC converter 117, is configured to receive the first output current 106-I when the first switch 106-S is closed, the second output current 107-I when the second switch 107-S is closed, and the third output current 124-I when the third switch 124-S is closed. The fourth converter, DC/DC converter 117, is further configured to output a fourth output current based one or more of the first output current 106-I, the second output current 107-I, and the third output current 124-I. In some embodiments, the first output current 106-I and the second output current 107-I combine as combined charging current 108-I. Thus, the fourth input current received by the fourth DC/DC converter 117 is the first output current 106-I, the second output current 107-I, the third output current 124-I, the combined charging current 108-I, or any combination or permutation of such currents. During operation, there can be changes to the source and/or combination of currents that form or create the fourth input current received by the fourth DC/DC converter 117. For example, when the fourth DC/DC converter 117 is receiving the combined charging current 108-I, the energy storage 103 and/or the second DC/DC converter 107 may malfunction, or the energy storage 103 may become depleted, causing the charging device 190 to add or supplement the first output current 106-I with the third output current 124-I.

The DC output circuit, via DC/DC converter 117, through a fourth switch 117-S when closed (or DC/DC converter 106 when the output stage DC/DC converter 117 is not implemented; not shown), feeds a fourth output current or EV charging current 117-I (or a first output current 106-I when the DC/DC converter 117 is not implemented, not shown) directly to the EV's battery pack 111 through the DC charging ports of the EV 105, such as EV charging plug ports 113-DC.

In some embodiments, when insufficient electricity from solar power generated by photovoltaic system 101 or stored electricity from battery storage 103 is available, a standard AC power source 130 alternatively can provide power or AC current 130-I to the electric vehicle's battery charger through the EV's onboard AC/DC converter 115 through the AC charging ports 113-AC of the EV 105. The AC power source 130 is electrically connected to a fifth switch 130-S. Power source 130 may be separate from source 110, or the same as source 110, and electrically connected to a switch (not shown) to supply either current 110-I or current 130-I. In some embodiments, power source 130 is electrically connected to a switch (not shown) to supply both current 110-I and current 130-I, or either current 110-I or current 130-I. In some embodiments, as illustrated in FIG. 1, AC current 130-I flows to AC/DC converter 115 when the fifth switch 130-S is closed (on).

The system 100 may use DC power to improve the rate of EV charging. The DC power may be provided by the photovoltaic system 101 and/or the building AC source 110, including using DC power directly from PV 101, DC power stored in the energy storage 103 (whether stored from power coming from PV 101, from AC source 110, and/or from EV battery 111), and/or DC power from AC source 110 after conversion to DC by AC/DC converter 124. The DC power from each DC source, the PV 101 and the energy storage 103, is supplied to an isolated DC/DC converter as necessary to create the appropriate voltage for the electric vehicle 105. The AC power from each AC source, the AC source 110 and AC source 130, is supplied to an isolated AC/DC converter as necessary to create the appropriate voltage for the electric vehicle 105. For example, the appropriate voltage may be between 100V to 450V. The output power is proportional to the available solar power, such as 15 KW. The DC power is provided to the EV battery pack through the DC ports of the EV charging plug 113.

The battery 103 may also be charged directly from the grid, prior to or when not sending the second input current to the second DC/DC converter 107. In some embodiments, the third output current 124-I, generated from or based on the AC input current 110-I from the grid AC power source 110, flows to and becomes a second converter charging input current 107-I flowing towards a bidirectional second DC/DC converter 107. In some embodiments, the third output current 124-I, combines with the first output current 106-I and/or with the first discharging output current from the bidirectional fourth DC/DC converter 117, and flows to and becomes the second converter charging input current 107-I flowing towards a bidirectional second DC/DC converter 107. The bidirectional fourth converter 117 is configured to receive the discharging input current 117-I, generate a first discharging output current based on the discharging input current 117-I. The second DC/DC converter 107 is further configured to receive the second converter charging input current 107-I and generate a second converter charging output current that is received by and charges (or recharges) the energy storage 103.

In some embodiments, the system 100 may increase its charge rate by combining two or more of the PV solar 101, building energy storage 103 and standard AC converted to DC sources 124. The voltages of the two or three of the sources are matched and combined to achieve a faster charge rate than provided by any one individually. The aggregation of these streams into a single DC output occurs prior to the DC ports of the EV charging plug 113.

The bi-directional DC-DC converter 117 takes the combined DC inputs prior the DC ports of the EV charging plug 113. In one aspect, the DC output (EV charging current/fourth output current 117-I) can be fed to the EV's battery management system 109 of the EV 105 through a bi-directional DC-DC converter 117 that generates the fourth output current 117-I, which can both dynamically match the voltage desired by the EV's battery management system 109 for charging the battery pack 111 and return electricity from the EV battery pack 111 back into the house load for emergency use or peak leveling situations. For example, the device 190 may open first switch 106-S and second switch 107-S, close third switch 124-S and fourth switch 117-I, have the fourth bidirectional DC/DC converter 117 receive current from battery 111 and/or the battery management system 109, have the fourth bidirectional DC/DC converter 117 generate a DC return electricity and send the DC return electricity to the third bidirectional AC/DC converter 124. The third bidirectional AC/DC converter 124 is configured to receive the DC return electricity and transform the DC return electricity to an AC return current, which may be available for direct use, connect to the grid, or return back into the house load.

The system 100 includes a controller 119 configured to control switches 106-S, 107-S, 124-S, 130-S, and/or 117-S. In some embodiments, the controller 119 is configured to automatically control the switches at the outputs of the power source(s) and/or the converters 106, 107, 124, and/or 117 based on power input from the photovoltaic system 101 (with or without optimizer 102), from building battery or energy storage 103, and/or from DC supplied directly to EV battery pack converted from standard AC and AC supplied directly to the EV's onboard AC/DC converter. Alternatively, the user may manually alter or control the switches based on a desired power source, power demands, and/or availability. In operation, a software program, algorithm, electronic state, or process is implemented by the controller 119 such that the positions of the switches 106-S, 107-S, 124-S, 130-S, and/or 117-S corresponds to a mode of operation. For example, if a user, through an interface (not shown), manually switches the charging device 190 from AC power supply only mode (power supplied only from power source 130) to PV power only mode (power supplied only from solar panels 101), the controller 119 turns first switch 106-S from off to on (connected), fifth switch 130-S from on to off (disconnected), and fourth switch 117-S from off to on (connected), and leaves second switch 107-S and third switch 124-S off (disconnected). The same would happen if an algorithm detects it is appropriate to automatically turn the switches as described: the controller 119 is configured to automatically detect states of connectivity with power sources and with the EV (including the power available from the power sources and/or the charging needs of the EV). Following the same example, if the charging device 190 and/or the controller 119 detect and/or receive information that the charging device 190 needs to change from PV power supply mode (this mode can be supplemented by energy storage 103 and/or AC power supply 110), to AC power supply mode (this mode can be supplemented by energy storage 103 and/or AC power supply 110), the controller 119 turns first switch 106-S from on to off (disconnected) and fifth switch 130-S from off to on (connected). In either PV power supply mode or AC power supply mode, the controller 119 is configured to determine whether supplemental power from energy storage 103 and/or AC power source 110 is needed, and to turn switches 107-S, 124-S and/or 117-S on or off based on the supplemental power need determination. In some embodiments, the controller 119 is configured to operate in automatic mode. In automatic mode, the controller 119 is configured to adjust the positions of switches 106-S, 107-S, 124-S, 130-S, and/or 117-S based on which power sources are connected and/or available to the charging device 190, the need for supplemental power, the EV 105 being connected to port 113-AC and/or port 113-DC, a parameter indicating power source preference, partial manual instructions from a user, pre-programmed instructions, and/or the like. In the disclosures herein, including the disclosures related to the other figures, it should be understood that a controller, such as controller 119, (including when not shown) is configured to adapt the charging device to any feasible operation mode by detecting the external connections to and/or power requests to the charging device and, based on the detected connections and/or power requests, adjust the corresponding switches to disconnect or to connect the various components as appropriate for the mode, connections, and/or power requests, including when the mode is based on available/desired power sources, when the mode is based on desired function (such as charging mode and discharging mode), and/or when the mode does not specifically dictate all the switch positions. When the mode does not specifically dictate all the switch positions a controller (such as controller 119) can determine the appropriate position for any switch based at least on the detected connections and/or power requests. Charging mode and discharging mode are further discussed below.

Figure 2:
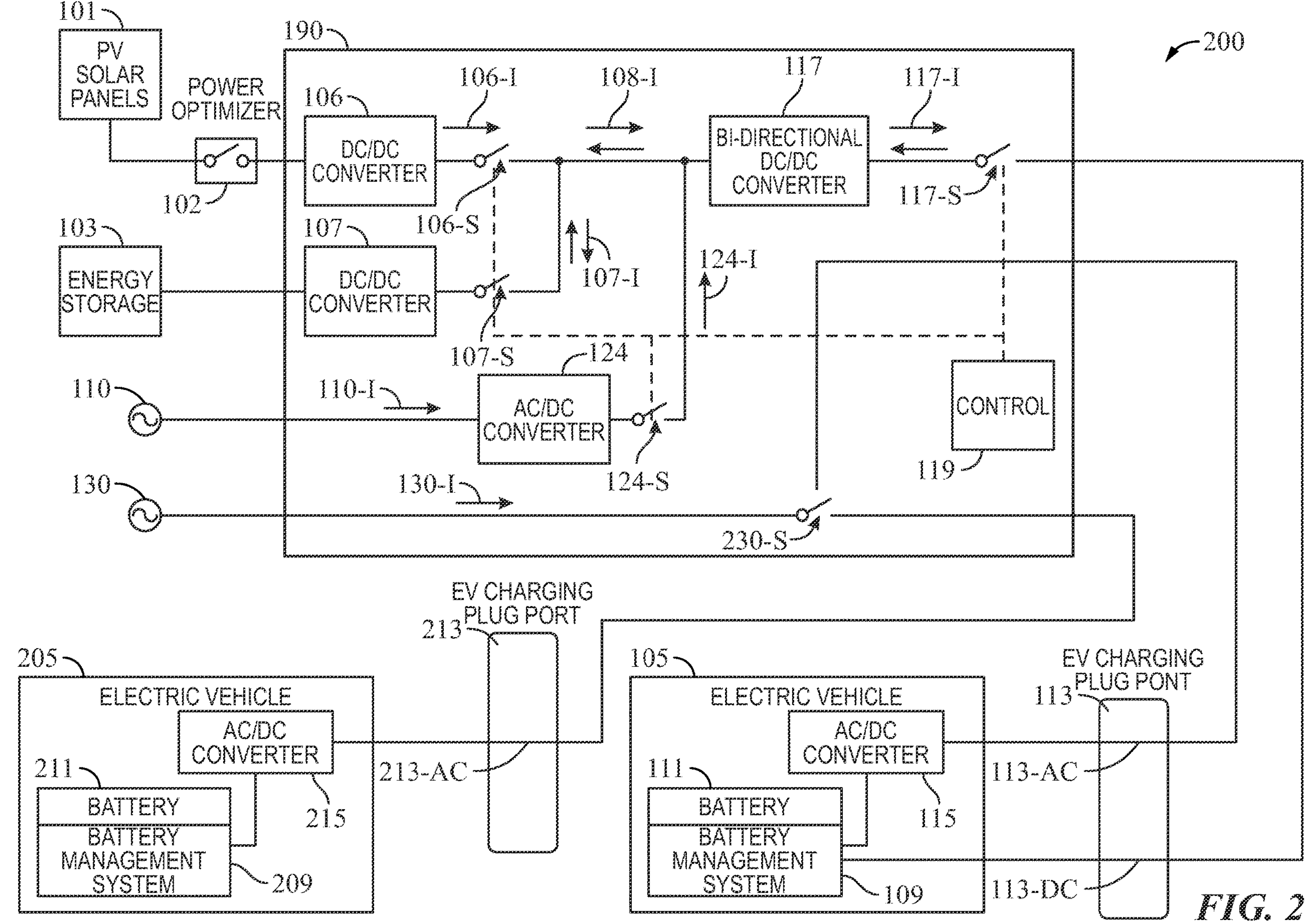
FIG. 2. illustrates a schematic of an electrical vehicle solar charging system which can charge two electric vehicles simultaneously, where the second is charged from an AC electricity source, like the grid.

FIG. 2 illustrates an electric vehicle solar charging system 200 that incorporates the features of the electric vehicle solar charging system 100. The system 200 includes a second output which charges a second EV 205 through a separate AC port plug 213, which charges its battery pack 211 through its on-board AC/DC converter 215 via the battery management system 209. This power is sourced from the same AC source 203 used to supply the other EV through its AC ports of its charging plug 113 to its onboard AC/DC converter 115 when that AC source 203 is not being used to charge the first EV 105. Alternatively, the AC source can be the same 201 as is connected to the AC/DC converter 124 which converts to high voltage DC and supplies the DC EV charging plug ports 113 when this power is not being used to charge EVI 105. The controller 119 dynamically directs this AC source to EVI 105 or EV2 205 to either maximize charging to the first EV 105 or concurrently charge both EVs 105 and 205, which can be done autonomously or through manual user control. The system 200 also includes a fifth switch 230-S, which incorporates the characteristics of the fifth switch 130-S. The fifth switch 230-S is configured to change the flow of the current 130-1 from going to EV 105 to going to EV 205 and vice versa. In some embodiments, the fifth switch 230-S is configured to change the flow of the current 130-1 from going to EV 105 to going to EV 205 and vice versa, to disconnect from both EV 105 and EV 205, and/or to simultaneously connect to both EV 1105 and EV 205. As discussed above, the controller 119 is configured to adjust the connection of fifth switch 230-S according to the appropriate mode.

Figure 3A:
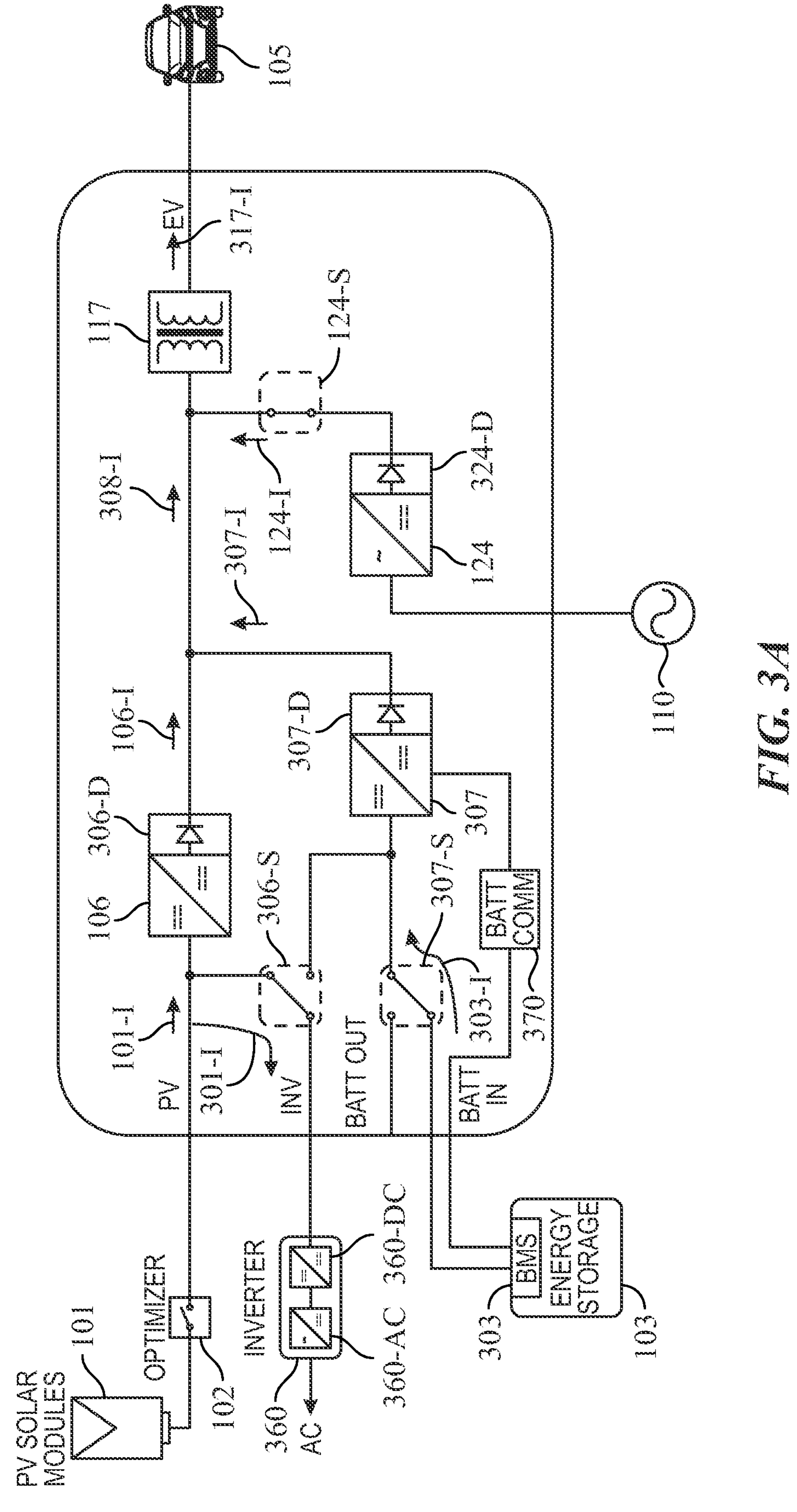
FIG. 3A illustrates a schematic of the electric vehicle solar charging system charging an electric vehicle, according to some embodiments.
Figure 3B:
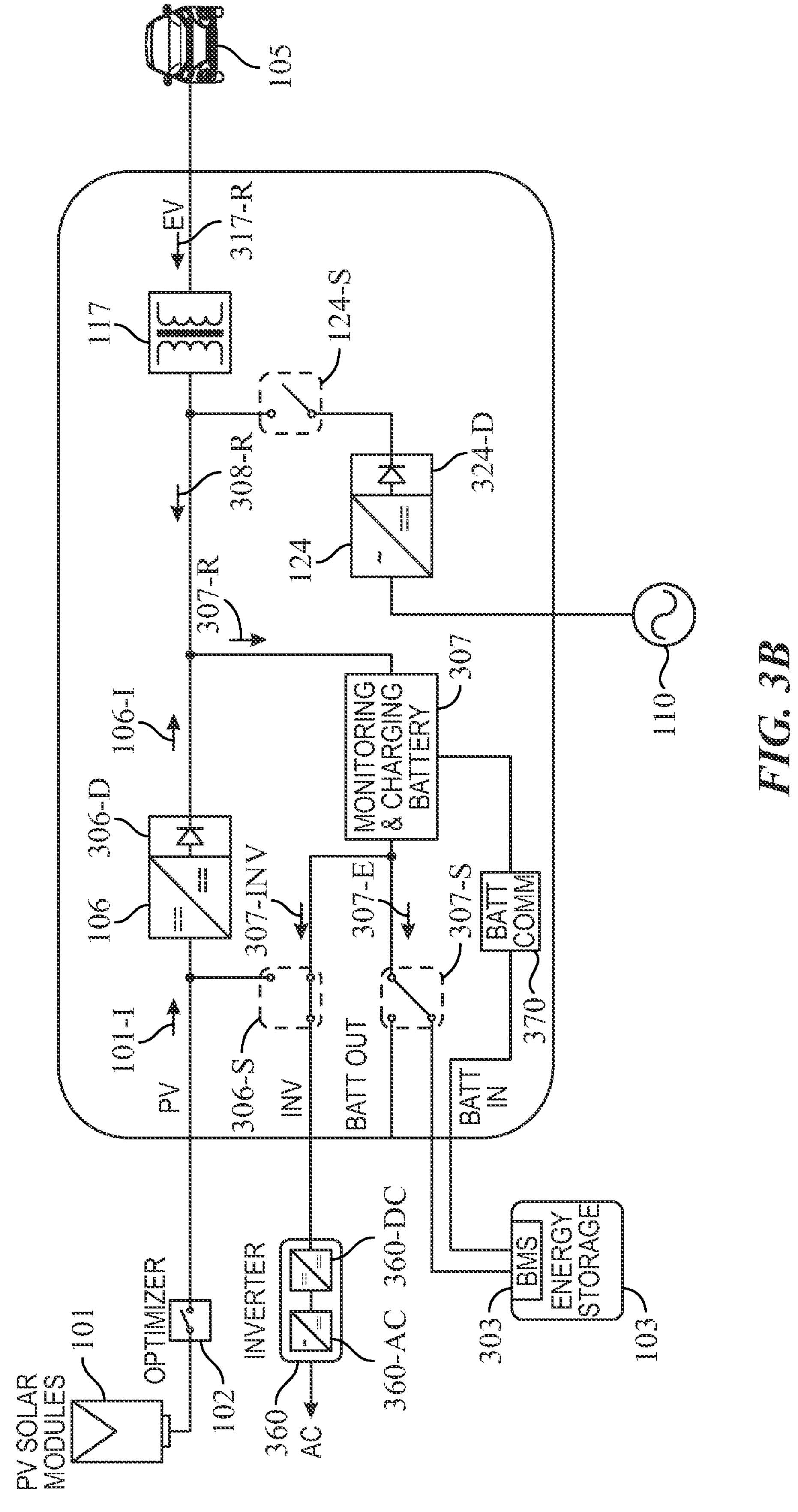
FIG. 3B illustrates a schematic of the electric vehicle solar charging system discharging an electric vehicle, according to some embodiments.

FIGS. 3A and 3B illustrate an electric vehicle solar charging system 300 that incorporates the features of the electric vehicle solar charging systems 100 and/or 200. The system 300 is configured to charge and/or discharge the energy source of the EV 105. FIG. 3A illustrates the system 300 in charging mode, wherein the EV 105 is charged by the system 300. The system 300 is configured to receive electricity, including as DC (direct current) from a renewable source, adapt the voltage of the received electricity, and charge the EV 105. In some embodiments, system 300 is configured to transmit part of or all received electricity to an inverter that transforms the received electricity to alternate current (AC) electricity, for example, for use as electricity in a house or building, use as an external AC power source, and/or the like. In some embodiments, system 300 comprises an energy storage 103 with a management system 303, such as a battery management system, electrically and communicatively connected to a second DC/DC converter 307. The energy storage 103, through the management system 303, is configured to transmit part of or all stored charge as DC electricity to the second DC/DC converter 307 or to an inverter 360 that transforms the received electricity to alternate current (AC) electricity, for example, for use as electricity in a house or building, use as an external AC power source, and/or the like. The system 300 is configured to divide the PV input current 101-I between a first input current received by the first converter 106 and an inverter current 301-I. There can be operational conditions in which the is no inverter current 301-I because there is no load at the inverter 360.

Before further discussing FIGS. 3A and 3B, the operation of the first converter 106 is further described below, as the other converters have the same features as and behave equally or comparatively similar to the first converter 106. It should be understood that the discussion of raising, lowering, changing, and/or adjusting voltage of an input current (for example, the first input current) to generate an output current (for example, the first output current 106-I), such voltage adjusting includes the inducing or causing of the output current by the input current in a circuit that causes the output current to have a different voltage from the input current.

The first converter 106 is configured to generate the first output current 106-I based on the first input current, and one or two voltage differentials. In some embodiments, the first converter 106 is configured to generate the first output current 106-I based on the first input current, and one or two predetermined voltage parameters. The first converter 106 is configured to determine a first voltage differential by comparing a voltage of the first input current with a first predetermined voltage parameter. The first converter 106 is further configured to generate the first output current 106-I based on the first input current and the first voltage differential. The predetermined voltage parameter is a value, magnitude, or amount of voltage necessary for the first output current 106-I to cause the charging of the energy source of the EV 105. In some embodiments, the first predetermined voltage parameter has a value of 380 VDC (meaning 380 volts, direct current), and the first converter 106 operates on the first input current if the voltage of the input current is less than 380 VDC; otherwise, the first converter 106 allows the first input current to pass through without interfering, the first input current is allowed to avoid passing through the first converter 106, or the first converter 106 receives and uses the first input current to generate an identical or substantially identical first output current 106-I. In some embodiments, the predetermined voltage parameter is a value, magnitude, or amount of voltage (or minimum voltage) necessary for the first output current 106-I to directly charge the energy source of the EV 105, without supplemental energy sources and/or without further voltage modification, for example, without implementing the fourth converter 117. The voltage differential is the difference between the voltage of the first input current and the predetermined voltage parameter. In some embodiments, the first predetermined voltage parameter is a lower limit, so that the first converter 106 is configured to raise the voltage of the first input current at or above the value of the first predetermined voltage parameter. In some embodiments, the first converter 106 is configured to detect or measure the voltage of the first input current and configured to determine the first voltage differential by comparing the voltage of the first input current to the first predetermined voltage parameter. The first converter 106 is further configured to generate the first output current 106-I based on at least one of first input current, the first predetermined voltage parameter, and the first voltage differential. The first converter 106 generates the first output current 106-I by changing the voltage of the first input current by at least the amount of the first voltage differential.

In some embodiments, the first converter 106 is configured to generate the first output current 106-I based on the first input current, a first voltage parameter, and a second predetermined voltage parameter. The second predetermined voltage parameter is a value, magnitude, or amount of voltage that the first output current 106-I should not exceed for the appropriate charging of the energy source of the EV 105. In some embodiments, the second predetermined voltage parameter has a value of 420 VDC, and the first converter 106 operates on the first input current if the voltage of the input current is more than 420 VDC (or less than 380 VDC, for embodiments implementing both the first and second predetermined voltage parameters); otherwise, the first converter 106 allows the first input current to pass through without interfering, the first input current is allowed to avoid passing through the first converter 106, or the first converter 106 receives and uses the first input current to generate an identical or substantially identical first output current 106-I.

In some embodiments, the first converter 106 is configured to generate the first output current 106-I based on the first input current, a first voltage differential, and a second voltage differential. The second voltage differential is the difference between the voltage of the first input current and the second predetermined voltage parameter. In some embodiments, the first converter 106 is further configured to determine a second voltage differential by comparing the voltage of the first input current with a second predetermined voltage parameter and to generate the first output current 106-I based on the first input current and a second voltage differential. In some embodiments, the first converter 106 is configured to generate the first output current 106-I based on the first input current and at least one voltage differential. In some embodiments, the second predetermined voltage parameter is an upper limit, so that the first converter 106 is configured to lower the voltage of the first input current at or below the value of the second predetermined voltage parameter. In some embodiments, the first converter 106 is configured to detect or measure the voltage of the first input current and configured to determine the second voltage differential by comparing the voltage of the first input current to the second predetermined voltage parameter. The first converter 106 is further configured to generate the first output current 106-I based on at least one of first input current, the second predetermined voltage parameter, and the second voltage differential. In some embodiments, the first converter 106 generates the first output current 106-I by changing the voltage of the first input current by at least the amount of the second voltage differential. In some embodiments, the first converter 106 generates the first output current 106-I by changing the voltage of the first input current to a value above the first voltage parameter and below the second voltage parameter.

In some embodiments, the second converter 107/307, the third converter 124, and/or the fourth converter 117 incorporate the above-described characteristics of the first converter 106, including when operating in the charging mode and in the discharging mode, and/or including when operating as a unidirectional converter or as a bidirectional converter.

FIG. 3A illustrates PV solar source 101 transmitting, through optimizer 102, a PV input current 101-I. The system 300 is configured to receive and divide the PV input current 101-I between a first input current received by the first converter 106 and an inverter current 301-I, the system 300 including an inverter switch 306-S. The inverter switch 306-S is electrically connected to the inverter 360 and is configured to alternate between electrically connecting the inverter 360 with the first DC/DC converter 106 (for example, in charging mode), and electrically connecting the inverter 360 with a second DC/DC converter 307 (in discharging mode). The second DC/DC converter 307 incorporates the features of the second DC/DC converter 107. There can be operational conditions in which there is no inverter current 301-I because there is no load at the inverter 360, regardless of whether the system 300 is in charging mode or discharging mode.

The first DC/DC converter 106 is electrically connected to a first diode 306-D. The first DC/DC converter 106 is configured to receive a first input current, generate a first output current 106-I based on the first input current, and transmit or output the first output current 106-I through the first diode 306-D. In some embodiments, the first diode 306-D is an ORing diode. In some embodiments, the first diode 306-D is a Schottky diode.

A second DC/DC converter 307, which incorporates the characteristics of the second DC/DC converter 107, is electrically connected to a second diode 307-D. The second DC/DC converter 307 is configured to receive a second input current, generate a second output current 307-I based on the second input current, and transmit or output the second output current 307-I through the second diode 307-D. In some embodiments, the second diode 307-D is an ORing diode. In some embodiments, the second diode 307-D is a Schottky diode. In charging mode, the second input current is energy storage current 303-I, which flows from the energy storage 103, via a battery management system 303 and through an energy storage switch 307-S (which is electrically connecting the battery management system 303 with the second converter 307), to the second DC/DC converter 307.

The third converter 124 is an AC/DC converter electrically connected to a third diode 324-D. The third converter 124 is configured to receive a third input current, generate a third output current 124-1 based on the third input current, and transmit or output the third output current 124-1 through the third diode 324-D. In some embodiments, the third converter 124 is configured to transmit or output the third output current 124-1 when a third output current switch 124-S is closed (for example, in charging mode). All the switches are controlled by the central controller 119, which utilizes a microprocessor or other logical digital control technology. In some embodiments, the third diode 324-D is an ORing diode. In some embodiments, the third diode 324-D is a Schottky diode. The third converter is electrically connected to a third output current switch 124-S through the third diode 324-D. In some embodiments, the third converter 124 is not implemented.

The first output current 106-I and the second output current 307-I combine into combined charging current 308-I, which incorporates the characteristics of combined charging current 108-I. At least one of the first output current 106-I, the second output current 307-I, the combined charging current 308-I, and the third output current 124-I, individually or any combination or superposition, reach and are received by the fourth converter 117 as the fourth input current. In some embodiments, the combined charging current 308-I must remain between 380 VDC and 420 VDC; therefore, voltage, current, energy, power, and/or similar parameters applicable to the first, second, and/or third converters 106, 107/307, and/or 124, such as the first and second predetermined voltage parameters, are implemented and configured to cause or generate a combined charging current 308-I between 380 VDC and 420 VDC.

The fourth DC/DC converter 117 is electrically connected to the first converter 106, the second converter 307, and the third converter 124. In some embodiments, the third converter 124 and the fourth converter 117 are electrically connected to each other through a third output current switch 124-S. The fourth DC/DC converter 117 is configured to receive the fourth input current and to output a fourth output current 317-I based on at least one or more of the first output current 106-I, the second output current 307-I, and the third output current 124-I.

In some embodiments, the battery management system 303 communicates with the second converter 307 through a battery communication module 370. The second converter 307 is configured to detect whether additional energy/current is needed to charge the EV 105 and/or for the operation of the system 300. The second converter 307 and/or the system 300 can detect or measure whether the voltage, current, power, and/or the like, of the first output current is sufficient, and if necessary, send a supplemental current request signal to the battery communication module 370. The supplemental current request signal carries information indicating how much energy, current, voltage, power, and/or the like is needed from the energy storage 103. The battery communication module 370 is configured to process the supplemental current request signal to generate a supplemental current instruction signal, and to send the supplemental current instruction signal to the battery management system 303. The supplemental current instruction signal causes the battery management system 303 to generate an energy storage current 303-I with the energy, voltage, current, power, and/or relevant characteristics that, when processed by the second converter 307 into the second output current 307-I, appropriately supplements the first input current 106-I, causing a desired combined charging current 308-I. The battery management system 303 is configured to receive the supplemental current instruction signal and to respond by discharging energy from the energy storage 103, generating the energy storage current 303-I based on the energy from the energy storage 103, the supplemental current request signal, and/or the supplemental current instruction signal. For example, if an embodiment requires the voltage of the second input current to be within the range between 100 VDC and 600 VDC, the system 300 can implement circuitry (not shown) to detect when the voltage of the second input current (which is the same as the energy storage current 303-I) falls outside the required range, and cause for the corresponding supplemental current request signal and/or the supplemental current instruction signal to be sent to instruct the battery management system 303 to adjust the energy storage current 303-I to have a voltage that falls within the required voltage ranges.

FIG. 3B illustrates the system 300 in discharging mode, wherein the EV 105 is discharged by the system 300. The system 300 in discharging mode operates similar to the operation in charging mode, but with the following differences. In discharging mode, the third output current switch 124-S is flipped open (eliminating the third output current 124-I), the inverter switch 306-S is flipped to electrically connect the inverter 360 to the second converter 307. The system 300 is further configured to receive electricity, including PV input current 101-I and/or discharge DC current 317-R from the EV 105 and adapt the voltage of the EV discharge DC current 317-R. In some embodiments, bidirectional fourth converter implements voltage parameters and/or changes or adjusts the EV discharge DC current 317-R to generate the adjusted EV discharge current 308-R. In some embodiments, the upper and lower voltage parameters for the EV discharge DC current 317-R are 420 VDC and 380 VDC, respectively. In some embodiments, the upper and lower voltage parameters for the EV discharge DC current 317-R match the upper and lower voltage parameters for the first input current, which in discharge mode is the same as PV input current 101-I.

In discharge mode, the system 300 is configured to transmit part of or all received EV electricity (the EV discharge DC current 317-R, and, if implemented and operating, the PV input current 101-1) to an inverter 360 that transforms the received electricity to alternate current (AC) electricity, for example, for use as electricity in a house or building, use as an external AC power source, and/or the like. Likewise, the system 300 is configured to transmit part of or all received EV electricity to charge (or recharge) the energy storage 103. The PV input current 101-1 and the adjusted EV discharge current 308-R combine into reverse second converter input current 307-R. The bidirectional second converter 307 is configured to receive the reverse second converter input current 307-R. In discharge mode, the second converter 307 behaves as a monitoring and battery charging module, configured to output a reverse second converter output current, which becomes at least one of a discharge mode inverter current 307-INV and an energy storage charging current 307-E. Also, the second diode 307-D is bypassed, such that the reverse second converter input current 307-R is not blocked from reaching the second converter/monitoring and battery charging module. If there is no load at the inverter 360, all the reverse second converter output current goes to (or is available for) the energy storage 103 (through the battery management system 303). If the energy storage is fully charged, the battery management system 303 communicates so to the second converter 307, which is in monitoring/battery charging mode. If the energy storage is not fully charged, the battery management system 303 communicates so to the second converter 307, which is configured to determine the voltage, current, energy, power, and/or the like, to appropriately generate the energy storage charging current 307-E. In some embodiments, the second converter 307 and the monitoring and charging battery module are separate components.

Whether the system 300 is in charging or discharging mode, the inverter 360 receives a current in DC form and outputs a current in AC form. The inverter 360 has a first inverter converter 360-DC electrically connected to a second inverter converter 360-AC. The current received by the inverter 360 first goes to the first inverter converter 360-DC, which is a DC/DC converter configured to generate an internal inverter current by changing or modifying the voltage of the current received by the inverter 360 for appropriate conversion by the second inverter converter 360-AC. The second inverter converter 360-AC, which is an DC/AC converter, receives the internal inverter current and transforms the internal inverter current (DC) to an appropriate AC current, for example, for household use as an alternative power source.

The discussed configurations and their corresponding operations of systems 100, 200, and 300, in some embodiments, occur dynamically. For example, in an embodiment, the voltage of the first output current 106-I might fall within the desired value range of 380 VDC and 420 VDC, and later fall outside the desired value range, causing the systems 100/200/300 to dynamically detect the new voltage of the first output current 106-I (and/or a new value and/or a change in value of some other parameter), which in this example would cause the first converter 106 to alter the voltage of the first input current, as discussed above. In some embodiments, the voltage of the first output current 106-I might fall within a desired value range of 200 VDC and 420 VDC, and later fall outside the desired value range.

Figure 4A:
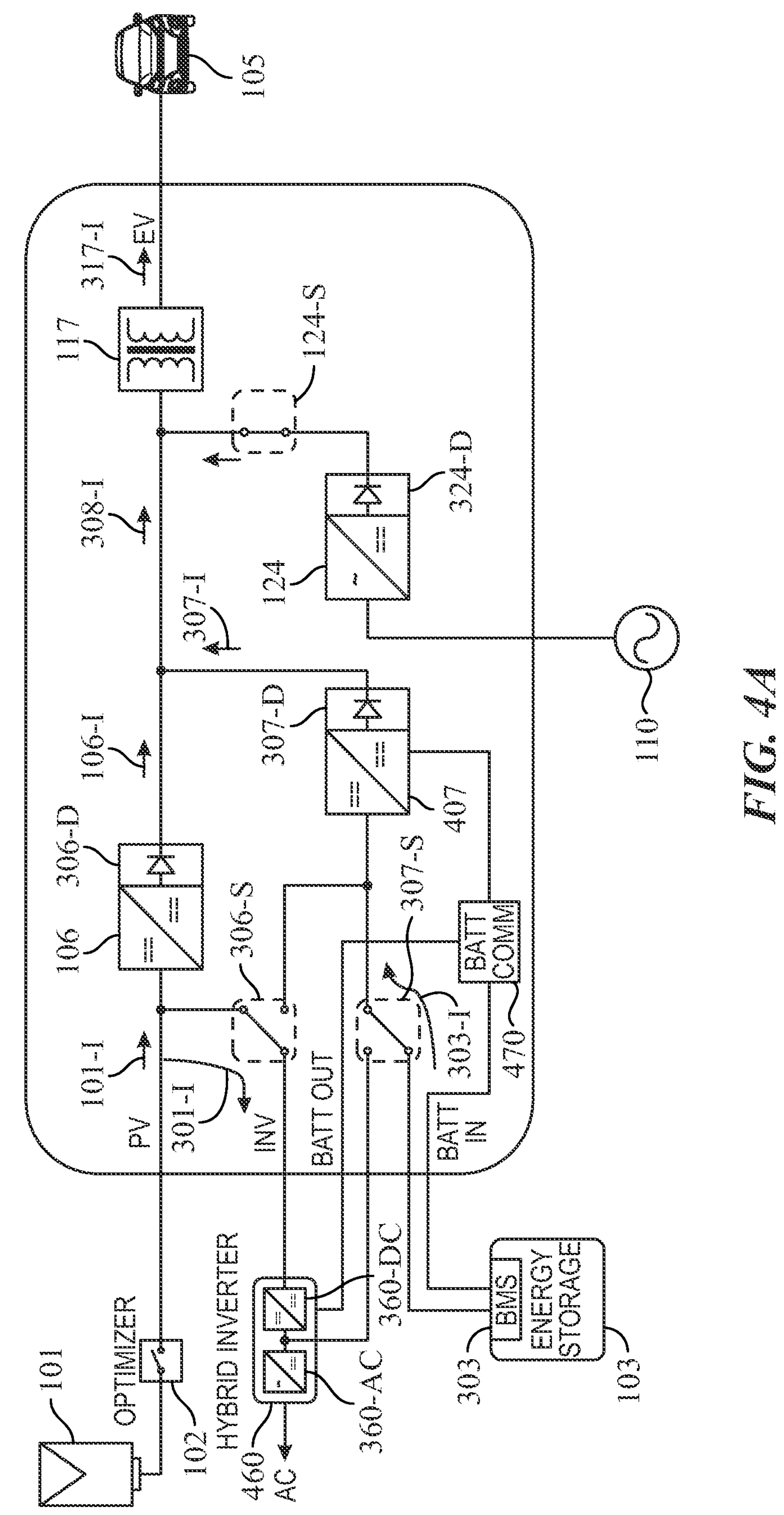
FIG. 4A illustrates a schematic of the electric vehicle solar charging system charging an electric vehicle, according to some embodiments.
Figure 4B:
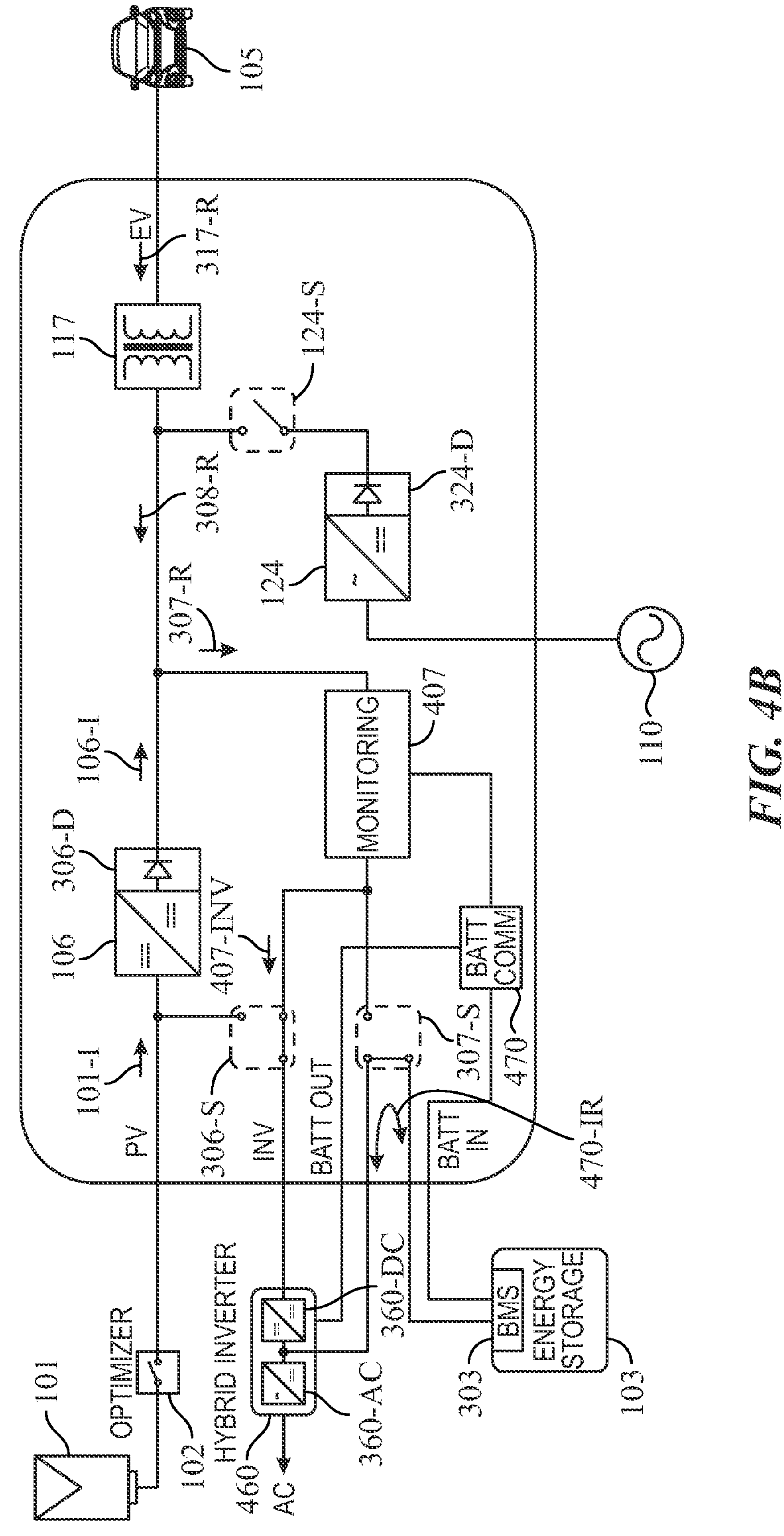
FIG. 4B illustrates a schematic of the electric vehicle solar charging system discharging an electric vehicle, according to some embodiments.

FIGS. 4A and 4B are similar to FIGS. 3A and 3B, respectively, but differ in that FIGS. 4A and 4B illustrate a hybrid inverter 460. The hybrid inverter 460, which incorporates the features of inverter 360, is electrically connected to the energy storage switch 307-S. FIGS. 4A and 4B illustrate an embodiment in which the energy storage switch 307-S is electrically connected to the node of the electrical connection between the first inverter converter 360-DC and the second inverter converter 360-AC of the hybrid inverter 460. In charging mode, as illustrated in FIG. 4A, the energy storage switch 307-S is flipped to electrically connect the battery management system 303 to the second converter 407, which incorporates the features of the second converter 307. The hybrid inverter 407, the battery management system 303, and the second converter 407 are each electrically and/or communicatively connected to the battery communications module 470. In charging mode (as shown in FIG. 4A), the battery communications module 470 enables the communication between the second converter 407 and the battery management system 303 as discussed above. In some embodiments, in charging mode, the battery communications module 470 communicates to the second converter 407, the inverter 460, and/or the energy storage 103 that the energy storage 103 is supplying current to the second converter 407, as necessary, without being connected to the hybrid inverter 460. In some embodiments, converter 106 can be substituted with a fixed DC output at the desired voltage of a connected PV hybrid string inverter, where that desired fixed output range is set by default or communicated to by EVSE device.

In discharging mode (as shown in FIG. 4B), the energy storage switch 307-S is flipped to electrically connect the battery management system 303 to the hybrid inverter 460. Note that FIG. 4B illustrates a second converter 407 that, in discharging mode, is monitoring but not charging the battery management system 303. The second converter 407 is configured to generate a discharge mode inverter current 407-INV, which incorporates the features of the discharge mode inverter current 307-INV, based on the reverse second input current 307-R. The hybrid inverter 460 is configured to receive the discharge mode inverter current 407-INV. The hybrid inverter 460 is further configured to determine whether additional power, energy, current, voltage, and/or the like is needed for a particular load.

The hybrid inverter 460 is further configured to generate an inverter offer-request signal that carries information about any additional power needed to supply current to a load at the hybrid inverter 460 or information about supplemental power available at the hybrid inverter 460 to charge the energy storage 103. The battery communications module 470 is configured to receive the inverter offer-request signal, to generate an inverter offer-request instruction signal based on the inverter offer-request signal, and to transmit the inverter offer-request instruction signal to the battery management system 303. The battery management system 303 is configured to receive the inverter offer-request instruction signal, to determine whether the hybrid inverter 460 is offering or requesting power/energy/current based on the inverter offer-request instruction signal, and to either generate a hybrid inverter-energy source current 470-IR or accept a hybrid inverter 460 originated hybrid inverter-energy source current 470-IR based on the determination of whether the hybrid inverter 460 is offering or requesting power/energy/current. If the hybrid inverter 460 is requesting power/energy/current to the battery management system 303, the battery management system 303 is configured to generate a hybrid inverter-energy source current 470-IR that flows from the battery management system 303 to the hybrid inverter 460 to supplement the power, voltage, current, and/or the like, for the hybrid inverter 460 to supply adequate electricity to the load. If the hybrid inverter 460 is requesting power/energy/current to the battery management system 303, the hybrid inverter 460 is configured to generate a hybrid inverter-energy source current 470-IR that flows from the hybrid inverter 460 to the battery management system 303 to charge the energy source 103.

The various converters 106, 107/307/407, 124, 117, 360-DC, and 360-AC may be implemented or embodied by different types of converters and/or combinations of converters, including AC/DC (diode or phase controller rectifier), AC/AC (matrix, modular matrix, frequency converter or cycloconverter/transformer), DC/DC (chopper, voltage, or current converter), DC/AC (inverter), boost, boost-on-demand, buck, buck-boost, interleaved buck-boost, multi-level buck-boost, full bridge isolated buck converter, unidirectional, bidirectional, PFC converters, BOOST PFC, isolated, CLLC, CLLLC, and/or the like.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. An electric vehicle (EV) solar charging system, comprising:

a DC/DC conversion system comprising a photovoltaic solar input configured to receive direct current (DC) electricity from a photovoltaic source;

the DC/DC conversion system configured to generate a converted DC electricity by adjusting a voltage of the DC electricity from the photovoltaic source to a necessary voltage; and the DC/DC conversion system further configured to transmit an EV charging DC electricity to a first EV via a DC input port of the DC/DC conversion system;

wherein the DC/DC conversion system comprises a first converter configured to generate a first output current by modifying the voltage of a first input current from the photovoltaic source based on at least one predetermined voltage parameter, and a bidirectional converter configured to receive the first output current and generate the EV charging DC electricity, wherein the EV charging DC electricity is dynamically matched to a voltage level requested by a battery management system of the first EV;

wherein the DC/DC conversion system comprises a second converter electrically connected to a second switch and configured to receive a second input current, the second converter further configured to generate a second output current based on the second input current and to output the second output current through the second switch when the second switch is closed;

wherein the DC/DC conversion system further comprises a controller configured to receive, from the first EV or the battery management system, a voltage-required signal and to generate and send a photovoltaic (PV) voltage-request signal to the photovoltaic source to cause the first converter to adjust the first output current;

wherein a first predetermined voltage parameter comprises a minimum operational voltage of 380 VDC and a second predetermined voltage parameter comprises 420 VDC, and the first converter is configured to alter the first output current by comparing a measured PV voltage to one or more of the predetermined voltage parameters and adjusting toward a range between the first predetermined voltage parameter and the second predetermined voltage parameter;

wherein the DC/DC conversion system is further configured to combine the first output current with a second output current from an energy storage and a third output current converted from AC power to form a combined charging current, and to supply the combined charging current to the first EV through a DC charging plug;

wherein the DC/DC conversion system is configured to operate in a charging mode and a discharging mode, wherein, during the discharging mode, electricity is received from the EV battery and routed back to a building load or a grid through the bidirectional converter and AC inverter, the AC inverter comprising a hybrid PV inverter configured to receive EV discharge current and provide AC to a household or the grid;

wherein the bidirectional converter comprises a third converter electrically connected to a fourth converter through the third output current switch, the third output current switch configured to alternate between electrically connecting the third converter and the fourth converter when the third output current switch is closed and electrically disconnecting the third converter and the fourth converter such that that the third converter is not electrically connected to the fourth converter when the third output current switch is open; and wherein in the charging mode, the EV solar charging system is configured such that:

the inverter switch electrically connects the inverter to the first converter and the photovoltaic source and the third output current switch is closed, and wherein in the discharging mode, the EV solar charging system is configured such that:

the inverter switch electrically connects the inverter to the second converter and to the energy storage and the third output current switch is open;

wherein the EV solar charging system, for discharging the first EV, is further configured to receive a discharging input current delivered from an electric vehicle energy source and to output an inverter output current.

2. The EV solar charging system of claim 1, wherein the EV charging DC electricity is also provided by the energy storage, the EV solar charging system configured to charge the energy storage with at least one of the DC electricity from the photovoltaic source and electricity from the grid, the energy storage configured to transmit a storage electricity to the first EV via the DC/DC conversion system as necessary to supplement or substitute the DC electricity from the photovoltaic source, the storage electricity incorporated into the EV charging DC electricity; and wherein the DC/DC conversion system is configured to directly transmit the EV charging DC electricity to a battery pack system on the first EV configured to power the first EV.

3. The EV solar charging system of claim 1, wherein an AC input is provided to the EV solar charging system, the AC input converted to DC in an AC/DC converter, and transmitted to the first EV, the AC/DC converter configured to transmit a DC-converted AC input to the first EV via the DC/DC conversion system as necessary to supplement or substitute the DC electricity from the photovoltaic source; and wherein the AC/DC converter is configured to convert the AC input to AC/DC converter output and to transmit the AC/DC converter output to the first EV via the DC/DC conversion system as necessary to supplement or substitute the DC electricity from the photovoltaic source, the storage electricity from the energy storage, or both the DC electricity from the photovoltaic source and the storage electricity from the energy storage.

4. The EV solar charging system of claim 1, wherein the direct current (DC) electricity from the photovoltaic source comprises at least one of DC electricity directly from the photovoltaic source, DC electricity from the photovoltaic source through an optimizer, and DC electricity from the photovoltaic source through a PV hybrid string inverter.

5. The EV solar charging system of claim 2, wherein the DC/DC conversion system is further configured to generate the EV charging DC electricity based on the converted DC electricity.

6. The EV solar charging system of claim 5, wherein the controller is configured to control one or more switches of the EV solar charging system, wherein the one or more switches are configured to change the EV solar charging system between the charging mode and the discharging mode.

7. The EV solar charging system of claim 6, wherein the bidirectional converter is configured to transmit the EV charging DC electricity to the first EV and to receive EV discharging DC electricity from the first EV via an EV charging DC plug.

8. The EV solar charging system of claim 7, further comprising an EV charging AC plug, where an AC electricity source is directed, through the EV charging AC plug, to an AC charging port of a second EV and charges the battery of a second EV through an onboard AC/DC charger of the second EV when the AC electricity source is not being used to charge the first EV.

9. The EV solar charging system of claim 8, wherein the photovoltaic source includes a rapid shutdown optimizer.

10. An electric vehicle (EV) charging system, comprising:

a first converter electrically connected to a first switch and configured to receive a first input current, the first converter further configured to generate a first output current based on the first input current and to output the first output current through the first switch when the first switch is closed;

a second converter electrically connected to a second switch and configured to receive a second input current, the second converter further configured to generate a second output current based on the second input current and to output the second output current through the second switch when the second switch is closed;

a third converter electrically connected to a third switch and configured to receive a third input current, the third converter further configured to generate a third output current based on the third input current and to output the third output current through the third switch when the third switch is closed;

a fourth converter configured to receive the first output current when the first switch is closed, the second output current when the second switch is closed, and the third output current when the third switch is closed, the fourth converter further configured to output a fourth output current based on one or more of the first output current, the second output current, and the third output current;

wherein the EV charging system is configured to receive the first input current delivered from a renewable energy source as direct current and to output the fourth output current as direct current for charging an electric vehicle energy source;

wherein the EV charging system further comprises an energy storage electrically and communicably connected to the second converter and configured to generate the second input current and an inverter electrically connected to the first converter and the renewable energy source;

wherein the EV charging system further comprises a third output current switch and an inverter switch, wherein the second converter is bidirectional;

wherein the fourth converter is bidirectional; and wherein the inverter is electrically connected to the first converter and the renewable energy source through the inverter switch, the inverter switch configured to alternate between electrically connecting the inverter with the first converter and the renewable energy source, and electrically connecting the inverter with the second converter and the energy storage such that the inverter is not electrically connected to the first converter and the renewable energy source;

wherein the third converter is electrically connected to the fourth converter through the third output current switch, the third output current switch configured to alternate between electrically connecting the third converter and the fourth converter when the third output current switch is closed and electrically disconnecting the third converter and the fourth converter such that that the third converter is not electrically connected to the fourth converter when the third output current switch is open; and wherein the EV charging system has a charging mode and a discharging mode, wherein in the charging mode, the EV charging system is configured such that:

the inverter switch electrically connects the inverter to the first converter and the renewable energy source; and the third output current switch is closed, and wherein in the discharging mode, the EV charging system is configured such that:

the inverter switch electrically connects the inverter to the second converter and to the energy storage; and the third output current switch is open;

wherein the EV charging system, for discharging an EV, is further configured to receive a discharging input current delivered from the electric vehicle energy source and to output an inverter output current.

11. An electric vehicle (EV) charging system, comprising:

a first converter electrically connected to a first diode and configured to receive a first input current, the first converter further configured to generate a first output current based on the first input current and to output the first output current through the first diode;

a second converter electrically connected to a second diode and configured to receive a second input current, the second converter further configured to generate a second output current based on the second input current and to output the second output current through the second diode;

a third converter electrically connected to a third diode and configured to receive a third input current, the third converter further configured to generate a third output current based on the third input current and to output the third output current through the third diode, wherein the third converter, through the third diode, is electrically connected to a third output current switch;

a fourth converter configured to receive the first output current, the second output current, and the third output current when the third output current switch is closed, the fourth converter further configured to output a fourth output current based on one or more of the first output current, the second output current, and the third output current;

wherein the EV charging system is configured to receive the first input current delivered from a renewable energy source as direct current and to output the fourth output current as direct current for charging an electric vehicle energy source;

wherein the EV charging system further comprises an inverter switch, wherein the second converter is bidirectional;

wherein the fourth converter is bidirectional; and wherein an inverter is electrically connected to the first converter and the renewable energy source through the inverter switch, the inverter switch configured to alternate between electrically connecting the inverter with the first converter and the renewable energy source, and electrically connecting the inverter with the second converter and an energy storage such that the inverter is not electrically connected to the first converter and the renewable energy source;

wherein the third converter is electrically connected to the fourth converter through the third output current switch, the third output current switch configured to alternate between electrically connecting the third converter and the fourth converter when the third output current switch is closed and electrically disconnecting the third converter and the fourth converter such that that the third converter is not electrically connected to the fourth converter when the third output current switch is open; and wherein the EV charging system has a charging mode and a discharging mode, wherein in the charging mode, the EV charging system is configured such that:

the inverter switch electrically connects the inverter to the first converter and the renewable energy source and the third output current switch is closed, and wherein in the discharging mode, the EV charging system is configured such that:

the inverter switch electrically connects the inverter to the second converter and to the energy storage and the third output current switch is open;

wherein the EV charging system, for discharging an EV, is further configured to receive a discharging input current delivered from the electric vehicle energy source and to output an inverter output current.

12. The EV charging system of claim 11, wherein the first converter configured to generate the first output current based on the first input current is further configured to determine a first voltage differential by comparing a voltage of the first input current with a predetermined voltage parameter and to generate the first output current based on the first input current and the first voltage differential; and wherein the predetermined voltage parameter is a minimum operational voltage, and the first converter is further configured to generate a voltage of the first output current at least as high as the predetermined voltage parameter.

13. The EV charging system of claim 12, wherein the minimum operational voltage is at least 200 volts.

14. The EV charging system of claim 11, wherein the third input current is alternating current, and the third output current is direct current.

15. The EV charging system of claim 11, wherein the first diode is an ORing diode.

16. The EV charging system of claim 11, wherein in the discharging mode:

the fourth converter is further configured to receive the discharging input current and generate a first discharging output current based on the discharging input current;

the second converter is further configured to receive the first output current and the first discharging output current, and to generate a second discharging output current;

at least part of the second discharging output current is received by at least one of the inverter and the energy storage; and the inverter is further configured to output the inverter output current.

17. The EV charging system of claim 11, further comprising an energy storage switch, wherein the energy storage is electrically connected to the second converter through the energy storage switch, the energy storage switch configured to alternate between electrically connecting the energy storage and the second converter and electrically connecting the energy storage and the inverter such that the energy storage is not electrically connected to the second converter;

the energy storage switch connects the energy storage to the inverter.

18. The EV charging system of claim 17, wherein in the discharging mode:

the fourth converter is further configured to receive the discharging input current and generate a first discharging output current based on the discharging input current;

the second converter is further configured to receive the first output current and the first discharging output current, and to generate a second discharging output current;

the second discharging output current is received by the inverter;

an inverter-storage current flows between the inverter and the energy storage, such that inverter-storage current flows in a direction corresponding to at least one from the inverter to the energy storage and from the energy storage to the inverter; and the inverter is further configured to output the inverter output current;

wherein the inverter is a hybrid inverter and further comprises a first inverter converter electrically connected to a second inverter converter via an internal converter connection; and wherein the inverter-storage current flows between the energy storage and the internal converter connection.

* * * * *